June 1, 1937.  C. TURNEPSEED  2,082,310
ATTACHMENT FOR DRILL PRESSES
Original Filed July 25, 1934
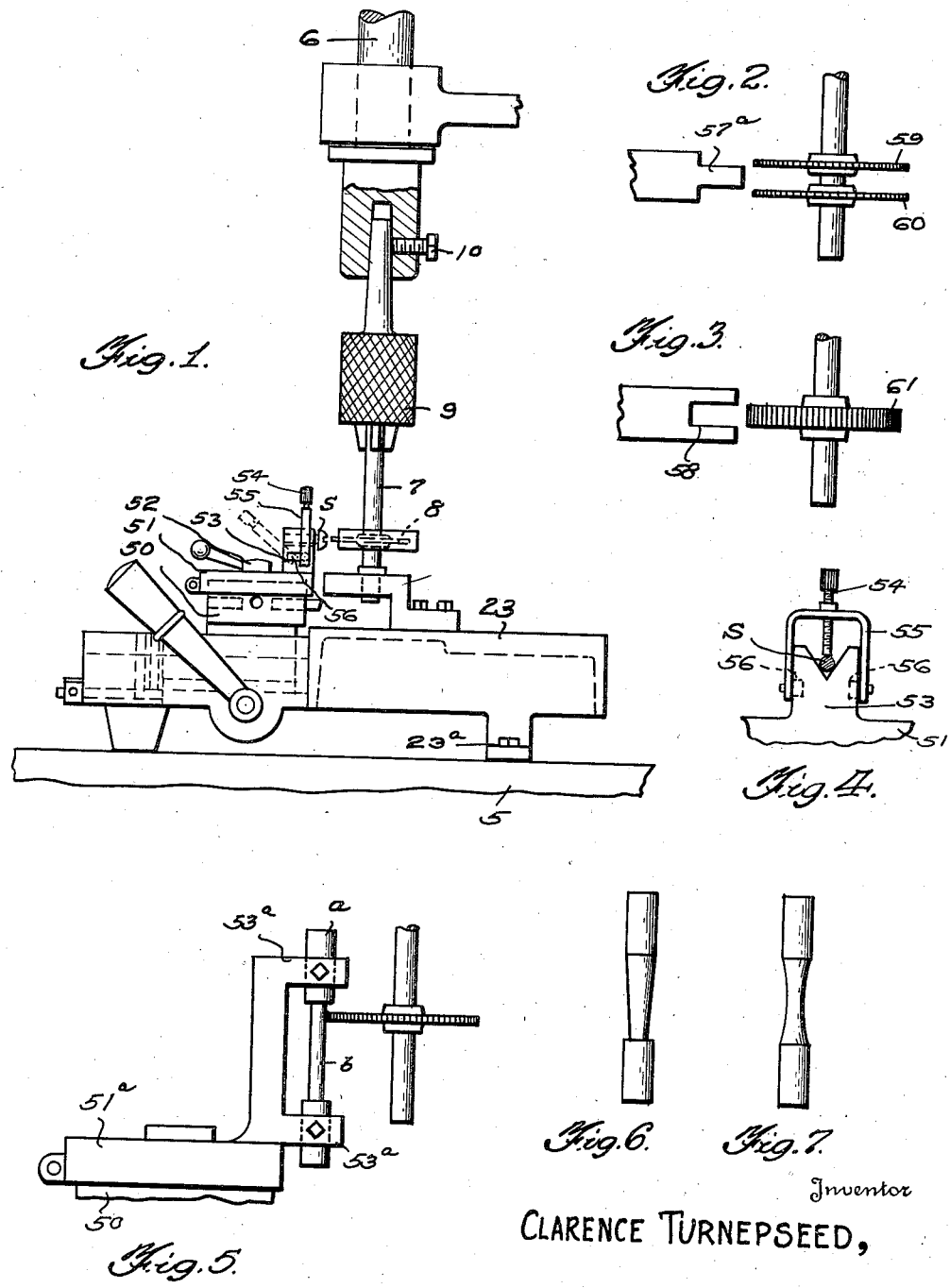
Inventor
CLARENCE TURNEPSEED,
Attorneys Patented June 1, 1937

2,082,310

UNITED STATES PATENT OFFICE 2,082,310

ATTACHMENT FOR DRILL PRESSES

Clarence Turnepseed, Springfield, Ohio, assignor of one-fourth to Frank G. Campbell, Arlington County, Va.

Original application July 25, 1934, Serial No. 736,922. Divided and this application January 28, 1935, Serial No. 3,855

4 Claims. (Cl. 90—19)

This invention relates to an attachment for drill presses of the conventional vertical type comprising a vertically disposed drill spindle and a substantitally horizontally disposed table. Drill presses of this character are very common and are familiar to all mechanics. The present application is a division of my co-pending application, Serial No. 736,922, filed July 25, 1934. The application aforesaid discloses a tool carrying slide supported from the table of a drill press and adapted to move turning and cutting-off tools into engagement with stock rotated by the movement of the drill spindle in such manner that pintles, arbors, and many other small shapes may be readily turned out without the necessity of employing a lathe.

The present invention contemplates the mounting of a tool in the nature of a circular saw in such manner as to rotate the same from the drill press spindle and the supporting of the same in such manner as to resist the lateral thrust of a piece of stock to be acted upon by said saw. The manner in which this is done, and some of the adaptations of this structure will be specifically pointed out in the detailed description which follows.

In the accompanying drawing,

Fig. 1 is a view partly in side elevation and partly in section showing the saw attachment applied to a conventional vertical type drill press.

Fig. 2 is a modification illustrating two saws adapted to reduce or flatten the end of a piece of round stock.

Fig. 3 is a detailed view of a piece of stock showing how the same may be slotted by the saw of Fig. 1.

Fig. 4 is a detail view of the work supporting block of Fig. 1.

Fig. 5 is a detail side view of a modified form of work holder, and

Figs. 6 and 7 illustrate shapes which may be made by the structure of Fig. 5.

Like numerals designate corresponding parts in all of the figures of the drawing. The elements 5 and 6 of Fig. 1 correspond to the like elements of the parent application above identified. That is to say, 5 designates the drill table and 6 the usual rotative spindle of a conventional type of drill press. I may clamp shaft 7, carrying a circular saw 8, directly in the drill spindle 6 for the purpose of rotating the same or I may clamp a chuck 9 in the spindle 6 by means of the screw 10, and have the shaft 7 engaged by the chuck, it being clear that it makes no difference just how the shaft 7 is engaged as long as it is rotated by the drill spindle 6.

In my parent application aforesaid, I have disclosed a tool carrying turret that is mounted to slide toward and from the axis of the shaft 7 and I employ such a structure in the present case, the same being illustrated in Fig. 1 where 50 designates the tool carrying turret. A ring 51 is clamped about the top of the turret by screw 52. This ring carries a block 53, the open face of which is V-shaped, or in the form of a concave recess. If the work to be done consists of slotting the heads of screws, for example, said screws are placed in the V-shaped recess of block 53, and a binding screw 54 is turned down to hold the screw firmly against movement.

This binding screw 54 passes through a yoke 55, the legs of which are engaged with slots 56 formed in the sides of the block. Thus, when the screw that is being acted upon, indicated at S, is to be removed, the binding screw 54 is released and the yoke is moved rearwardly and swung down to the dotted-line position of Fig. 1. Then the screw S may be lifted out of its seat and another substituted therefor, ready for the operation of slotting.

However, this device is by no means limited in its usefulness to the operation of slotting screws. If, for example, small pieces of stock be clamped in the block, the ends thereof may be reduced and flattened as indicated at 57 in Fig. 2, or may be slotted as indicated at 58 in Fig. 3 by the employment of two saws, as indicated at 59 and 60 in Fig. 2, or a single saw as indicated at 61 in Fig. 3. It is frequently desired to shape the end of small pieces of stock in the manner shown in Figs. 2 and 3, for the purpose of making articulated joints, the reduced and flattened end 57 of Fig. 2 entering the recess 58 of Fig. 3 and the whole being traversed by a hinge pin, not shown.

Most vertical type drill presses are constructed in such manner that the spindle 6 may be raised and lowered during the drilling operation, for the purpose of forcing the drill into the work. This capability of vertical movement of the drill spindle may be utilized to traverse the saw 8 bodily, vertically, during its cutting operation so that it may quickly rough off or reduce a piece of stock over a considerable length.

In Fig. 4, the ring 51a, corresponding to the ring 51 of Fig. 1, supports the overhanging lugs 53a, said lugs carrying set screws adapted to clamp a piece of stock in said lugs. In said Fig. 4 a piece of stock a has been reduced at b by simultaneously rotating the saw from the drill spindle and moving the saw bodily vertically. The extent of the reduction of the part *b* is of course determined by the degree of movement of the turret 50 toward the saw, and it is clear that by moving the turret carrying slide toward the saw during the vertical movement of the saw, the part *b* could be tapered as in Fig. 5. By moving the turret toward the saw during one-half of the vertical movement of the saw, and away from the saw during the other half of its vertical movement, the part *b* could be made concave, as in Fig. 6. There is almost no end to the multiplicity of shapes and small parts which may be turned out rapidly and accurately with this attachment.

I am aware of the fact that various grinding machines are on the market by means of which the grinding off and shaping of metal parts may be effected. However, these machines are specially made and are quite expensive. What I aim to do by the present invention is to provide an attachment adapted to take advantage of the existing capabilities of known drill presses so that the small work shop owner may, by the use of this attachment, turn out a multiplicity of small shapes, the creation of which would ordinarily require the purchase of a lathe. These capabilities are inherent, in part, in the structure of the present application and they are also inherent in the structure of my parent application aforesaid.

The block 23 corresponds to the block 23 of my parent application aforesaid, and is intended to be secured by the feet 23a, or otherwise, to the table 5. A guide 57 corresponds to the like element in the parent application and serves to hold the lower end of the shaft 7 against the lateral thrust that is brought thereon when the stock to be acted upon is moved into engagement with the saw. The slide 45 which carries the turret and the actuating means for the same are the same as in my parent application, above identified.

It is to be understood that the invention is not limited to the precise arrangements shown and described, because it is manifest that many ways will readily suggest themselves to the skilled mechanic of mounting stock to produce shapes of various kinds. Therefore, it is to be understood that the invention includes within its purview whatever changes fairly come within either the terms or the spirit of the appended claims.

Having described my invention, what I claim is:

1. The combination with the conventional vertical type drill press comprising its rotative spindle and supporting table, of a shaft and means for engaging the shaft with the spindle in such manner as to drive the shaft from the spindle, a tool carried by the shaft having a peripheral cutting edge, a slide supported upon the drill table, and means carried by the slide for firmly gripping and holding stock to be worked upon, the said slide being provided with means for advancing it toward the said tool.

2. A structure as recited in claim 1 in combination with settable stops carried by said slide to determine the degree of movement of the slide toward the tool.

3. The combination with the conventional vertical type drill press comprising its rotative spindle, tool engaging clutch carried by said spindle and supporting work table, of a shaft adapted to be engaged by said clutch in such manner that rotation may be imparted to said shaft from said clutch, a guide supported from the work table with which the lower end of said shaft engages and by which said shaft is held against wabbling while having both endwise and rotative movement in said guide, a slide supported upon the drill table and movable toward and from the axis of said shaft, means carried by said slide for gripping and holding work to be advanced toward said shaft, and a tool carried by said shaft and having a peripheral cutting edge for engagement with the work carried by said slide.

4. The combination with a vertical type drill press comprising a rotative spindle and table, of a block, means for mounting said block upon the table of the drill press, a guide carried by said block, a shaft, the lower end of which is adapted to be guided by said guide, said shaft being actuated from the drill spindle, a tool having a peripheral cutting edge carried by said shaft, a slide carried by the block, and a stock gripping means carried by the slide.

CLARENCE TURNEPSEED.